United States Patent
Cheng et al.

(10) Patent No.: US 11,550,880 B2
(45) Date of Patent: Jan. 10, 2023

(54) METHOD FOR CONTROLLING EXECUTION OF AN APPLICATION

(71) Applicant: THALES DIS CPL USA, Inc., Belcamp, MD (US)

(72) Inventors: YuBao Cheng, Beijing (CN); Hao Zhao, Beijing (CN); Kan Liu, Beijing (CN)

(73) Assignee: THALES DIS CPL USA, Inc., Belcamp, MD (US)

( * ) Notice: Subject to any disclaimer, the term of this patent is extended or adjusted under 35 U.S.C. 154(b) by 295 days.

(21) Appl. No.: 17/023,574

(22) Filed: Sep. 17, 2020

(65) Prior Publication Data

US 2021/0081515 A1 Mar. 18, 2021

(30) Foreign Application Priority Data

Sep. 17, 2019 (CN) .......................... 201910875994.4

(51) Int. Cl.
*G06F 21/10* (2013.01)
*G06F 9/455* (2018.01)
(Continued)

(52) U.S. Cl.
CPC ........ *G06F 21/105* (2013.01); *G06F 9/45558* (2013.01); *G06F 13/4282* (2013.01);
(Continued)

(58) Field of Classification Search
CPC ..................................................... G06F 21/64
See application file for complete search history.

(56) References Cited

U.S. PATENT DOCUMENTS

| | | |
|---|---|---|
| 2009/0094601 A1 | 4/2009 | Vstovskiy et al. |
| 2012/0246359 A1 | 9/2012 | Scragg, Jr. et al. |
| 2018/0107810 A1 | 4/2018 | Kapolnek |

FOREIGN PATENT DOCUMENTS

| | | | | |
|---|---|---|---|---|
| EP | 2955651 A1 | 12/2015 | | |
| WO | WO-2014138148 A2 * | 9/2014 | ............. | G06F 21/10 |

OTHER PUBLICATIONS

Notification of Transmittal of the International Search Report and the Written Opinion of the International Searching Authority (Forms PCT/ISA/220, PCT/ISA/210, and PCT/ISA/237) dated Jan. 19, 2021, in corresponding International Application No. PCT/US2020/051920. (17 pages).

\* cited by examiner

*Primary Examiner* — Henry Tsai
*Assistant Examiner* — Juanito C Borromeo
(74) *Attorney, Agent, or Firm* — Marc Boillot; Thales Dis CPL USA, Inc

(57) ABSTRACT

The invention is a method for controlling execution of an application. The method comprising:
 installing and activating a software license unit including License terms and a secure repository comprising both an applet and parameters,
 providing a virtual USB dongle including a command gate, a License validator, a VM controller and a VM engine initially devoid of applet,
 verifying the License terms and only if the verification of the License terms is successful: loading said applet and parameters to the VM engine and enabling the Command gate,
 initializing configuration data and secret data in the VM engine by using the parameters stored in the VM engine
(Continued)

then exchanging, between the applet and said hardware function driver, USB messages to control execution of said application.

15 Claims, 4 Drawing Sheets

(51) Int. Cl.
    *G06F 13/42*     (2006.01)
    *G06F 21/12*     (2013.01)

(52) U.S. Cl.
    CPC .... *G06F 21/12* (2013.01); *G06F 2009/45579* (2013.01); *G06F 2213/0042* (2013.01); *G06F 2221/0773* (2013.01)

METHOD FOR CONTROLLING EXECUTION OF AN APPLICATION

FIELD OF THE INVENTION

The present invention relates to methods for controlling execution of an application. It relates particularly to methods of controlling execution of applications deployed in the cloud environment.

BACKGROUND OF THE INVENTION

Control of execution of some stand-alone applications may be managed by hardware Universal Serial Bus (USB) dongles which are in charge of managing and storing the so-called software licenses. Hardware USB dongles are well-suited for controlling execution of applications installed on Personal computers for example. When such a stand-alone application migrates to the cloud environment, there would be a big challenge for those applications protected by the USB dongle since usually there is no available USB port on cloud servers.

One possibility is to adopt pure software or cloud solutions which imply to redesign the license term, change the source code and rebuild the applications. This way would take a lot of time and effort for implementation, testing and deployment in the cloud or virtual environment.

It is known to routes USB requests to a remote USB dongle. Such a redirection mechanism increases the effort to manage the machine on both sides and network latency could impact performances.

The document CN101201883 describes a solution based on HCPL and a virtual machine. The documents U.S. Pat. Nos. 9,858,224 and 9,116,821 describe USB emulation layer and USB device virtualization. The U.S. Pat. No. 9,158,912 describes a virtual appliance device like USB comprising a DRM module.

There is a need to enhance control of execution of applications deployed in the cloud environment.

SUMMARY OF THE INVENTION

The invention aims at solving the above mentioned technical problem.

An object of the present invention is a computer-implemented method for controlling execution of a deployed application that relies on a hardware function driver for communicating with Universal Serial Bus devices. The method comprises the steps:

1) a License management service installs and activates a software license unit including License terms and a secure repository that comprises both a dongle firmware applet and parameters,
2) providing a virtual USB dongle including a command gate, a License validator, a VM controller and a VM engine initially devoid of Dongle FW applet,
3) the License validator starts verification of the License terms in the Software license unit,
4) the VM controller loads said dongle firmware applet and parameters from the secure repository to the VM engine only if the verification of the License terms is successful,
5) the Command gate is enabled only if the verification of the License terms is successful, then the Command gate instantiates a virtual USB dongle,
6) the dongle firmware applet initializes configuration data and secret data in said VM engine by using the parameters stored in the VM engine,
7) the dongle firmware applet of the VM engine exchanges, messages compliant with USB protocol with said hardware function driver to control execution of said deployed application.

Advantageously, a preset timer may trigger the License validator to verify said License terms and if the verification of the License terms is successful the Command gate can be enabled and the VM engine can be loaded Advantageously, a preset timer may trigger the License validator to verify said License terms and the Command gate may be disabled and the VM engine may be cleared if the verification of the License terms is unsuccessful.

Advantageously, the dongle firmware application may be stored in an encrypted form in the secure repository and the VM controller may decipher said dongle firmware application and load to the VM engine a plain form of the dongle firmware application.

Advantageously, each time the virtual USB dongle restarts, the License validator may verify the License terms, the Command gate may be disabled and the VM engine may be cleared if the verification of the License terms is unsuccessful.

Advantageously, each time the parameters stored in the VM engine are modified, the VM controller may synchronize the software License unit by updating the parameters stored in the secure repository.

An object of the present invention is a system for controlling execution of a deployed application which relies on a hardware function driver for communicating with USB devices. The system comprises:
- a virtual USB dongle including a Command gate, a License validator, a VM controller and a VM engine, and
- a License management service configured to install and activate a software license unit including License terms and a secure repository comprising both a dongle firmware application and parameters.

The License validator is in turn configured to access the software license unit to verify said License terms. The VM controller being configured to load said dongle firmware applet and parameters from the secure repository to the VM engine only if the verification of the License terms is successful. The system is configured to enable the Command gate only if the verification of the License terms is successful. The dongle firmware applet is configured to initialize configuration data and secret data in said VM engine by using said parameters stored in the VM engine. The dongle firmware applet is configured to exchange, messages compliant with USB protocol with the hardware function driver to control execution of the deployed application.

Advantageously, the system may include a preset timer configured to trigger the License validator to verify said License terms and the system may be configured to enable the Command gate and load the VM engine if the verification of the License terms is successful.

Advantageously, the system may include a preset timer configured to trigger the License validator to verify said License terms and the system may be configured to disable the Command gate and clear the VM engine if the verification of the License terms is unsuccessful.

Advantageously, the dongle firmware applet may be stored in an encrypted form in the secure repository and the VM controller may be configured to decipher said dongle firmware applet and to load to the VM engine a plain form of the dongle firmware application.

Advantageously, each time the virtual USB dongle restarts, the License validator may be configured to verify said License terms and the system may be configured to disable the Command gate and clear the VM engine if the verification of the License terms is unsuccessful.

Advantageously, each time the parameters stored in the VM engine are modified, the VM controller may be configured to synchronize the software License unit by updating the parameters stored in the secure repository.

Advantageously, the system may include several virtual USB dongles and communicate with a plurality of deployed applications, each of said virtual USB dongles being allocated to control execution of at least one or several of said deployed applications.

The system may work in stand-alone mode or in distributed mode.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention allows to control emulating a USB dongle via software license mechanism. The invention may apply to any type of application whose execution is intended to be controlled by hardware dongle. It is well-suited for applications deployed in cloud environment, software container frameworks or virtualized environment.

The invention system can be configured as stand-alone mode or distributed mode.

Figure 1:
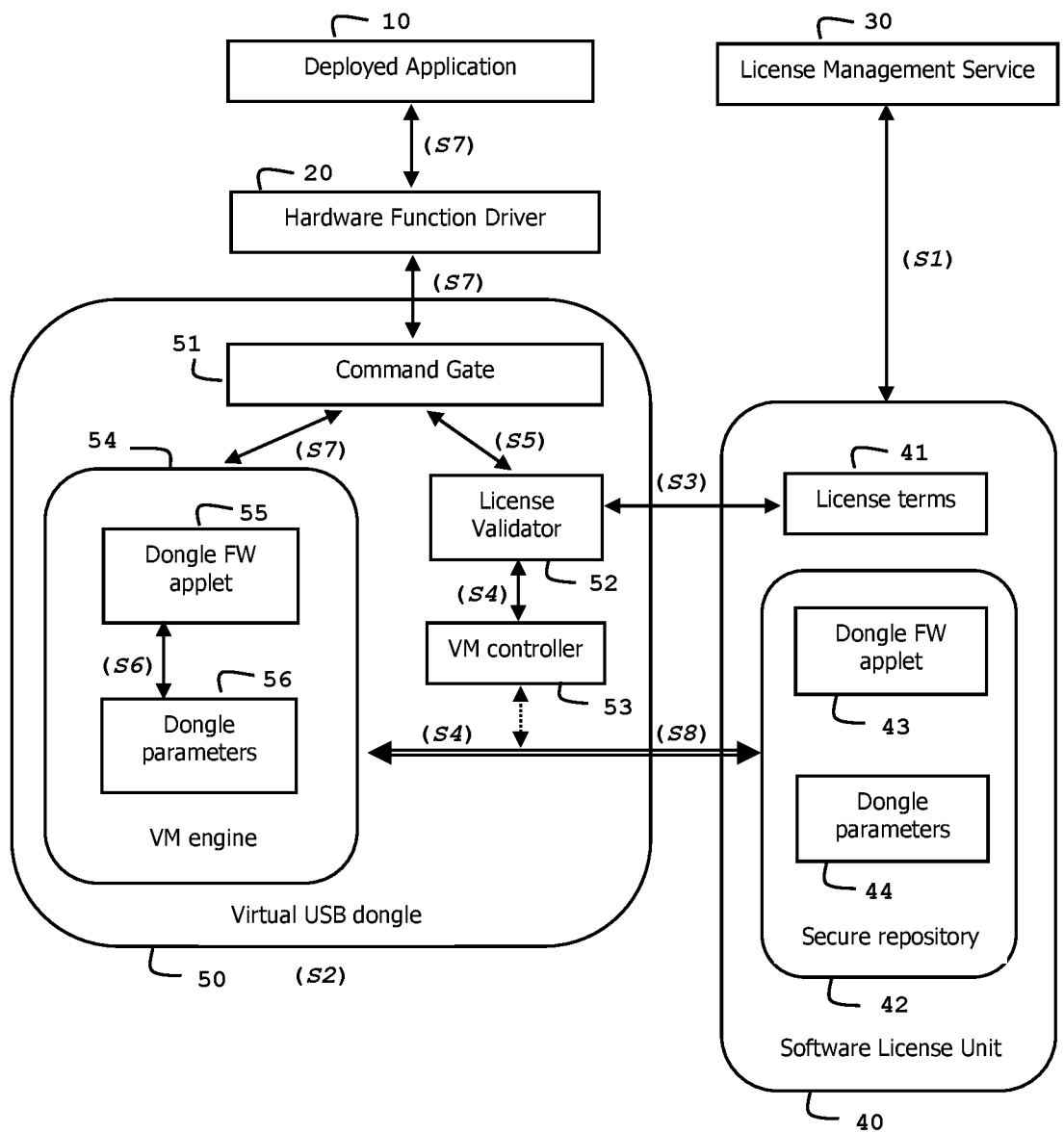
FIG. 1 is an architecture of a stand-alone mode system according to an example of the invention.

FIG. 1 shows an example of architecture of a stand-alone mode system according to an example of the invention.

In this example, the application 10 to protect (also named deployed application) and the system are deployed on the same machine in the cloud environment. The stand-alone mode is recorded into a mode configuration file on this machine.

The deployed application 10 relies on a hardware function driver 20 intended to communicate with USB devices. Preferably the hardware function driver 20 is a conventional USB driver. (I.e. not customized for the invention).

The system comprises a virtual USB dongle 50 which can be implemented as VHCI (Virtual Host Controller Interface) Driver. A VHCI driver can be able to emulate a real USB host controller interface and to handle attachment, detachment, enumeration and initialization of USB devices. Initially, the virtual USB dongle 50 includes several software components: a Command gate 51, a License validator 52, a VM (Virtual Machine) controller 53 and a VM (Virtual Machine) engine 54.

The system comprises a License management service which is configured to install and activate a software license unit 40 in the system. The software license unit 40 can be a license data storage that includes License terms 41 and a secure repository 42. The secure repository 42 comprises both a dongle firmware applet 43 and dongle parameters 44.

The License terms 41 can be implemented as conventional License terms which grant access to a set of services of an application for a specific time/duration. For example, the License terms 41 can grant access to the Virtual USB Dongle for either one year or for a limited number of uses.

The system comprises a Command gate 51 which is configured to control the communication between the hardware function driver 20 and the virtual USB dongle 50. Enable/disable the Command gate 51 means enable/disable the communication between the hardware function driver 20 and the virtual USB dongle 50. The Command gate 51 is also in charge of instantiating the virtual USB dongle 50 and disable the virtual USB dongle 50.

The system comprises a License validator 52 which is configured to access the Software license unit 40 to verify the License terms 41. In stand-alone mode, the VM controller can access the Software license unit 40 directly via a specific license API (Application Programming Interface). The License validator 52 is configured to inform the VM controller 53 once the validation is passed.

The VM controller 53 is configured to load the dongle firmware applet 43 and dongle parameters 44 from the secure repository 42 to the VM engine 54 only if the verification of the License terms 41 is successful. In other words, the VM engine 54 is populated using the content of the secure repository 42 only if authorized in the License terms 41. Once the Dongle FW applet 55 and Dongle parameters 56 finish loading, the system is configured to enable the Command gate 51.

The VM engine 54 allows to isolate the sensitive code and secrets from the other normal runtime processes.

Once installed in the VM engine 54, the dongle firmware applet 55 is able to handle two kinds of commands: a set of standard USB requests and a set of specific commands aiming at managing the content of the VM engine 54.

Once installed in the VM engine 54, the dongle firmware applet 55 is configured to initialize configuration data and secret data in the VM engine 54 by using the dongle parameters 56 stored in the VM engine 54.

Once installed in the VM engine 54, the dongle firmware applet 55 is configured to exchange messages compliant with USB protocol with the hardware function driver 20 to control execution of the deployed application 10.

In one embodiment, if the Software License Unit 40 is not activated before the virtual USB dongle 50 is installed, the system may include a preset timer configured to trigger the License validator 52 to verify the License terms 41 and the system may be configured to load the content of the VM engine 54 and enable the Command gate 51 if the verification of the License terms 41 is successful.

In one embodiment, if the license terms 41 in the software license unit 40 updated, the preset timer is configured to trigger the License validator 52 to verify the License terms 41 and the system may be configured to disable the Command gate 51 and clear the content of the VM engine 54 if the verification of the License terms 41 is unsuccessful.

In one embodiment, the dongle firmware applet 43 can be stored in an encrypted form in the secure repository 42 and the VM controller 53 can be configured to decipher the dongle firmware application 43 and to load to the VM engine 54 a plain form 55 of the dongle firmware application.

In one embodiment, each time the virtual USB dongle 50 restarts, the License validator 52 can be configured to verify the License terms 41 and the system can be configured to disable the Command gate 51 and clear the content of the VM engine 54 if the verification of the License terms 41 is unsuccessful.

In one embodiment, each time the data stored in the VM engine 54 are modified, the VM controller 53 can be configured to synchronize the Software License unit 40 by updating the corresponding data (e.g. dongle parameters 44) stored in the secure repository 42. The deployed application 10 can update the content of the dongle parameters 56 by recording an end-user information, a password or a serial number for example. Such changes can be automatically reflected in the secure repository 42 thanks to the VM controller 53.

In one embodiment, the system can include several virtual USB dongles and can communicate with a plurality of deployed applications, each of the virtual USB dongles being controlled by one Software license unit 40 and being allocated to control execution of one or several of the deployed applications.

Preferably, the virtual USB dongle 50 works in Kernel mode (I.e. at system kernel driver layer) so as to provide a high security level.

In one embodiment, the system includes two computers. A first computer comprises one or several processors, a first set of software instructions for handling the License management service 30 when executed on the processor(s) and a second set of software instructions for handling the Software License Unit 40 when executed on the processor(s). A second computer comprises one or several processors and a set of software instructions for creating and handling the virtual USB dongle 50 when executed on the processor(s).

In one embodiment, the system includes only one computer configured to handle all software components of the system.

Figure 2:
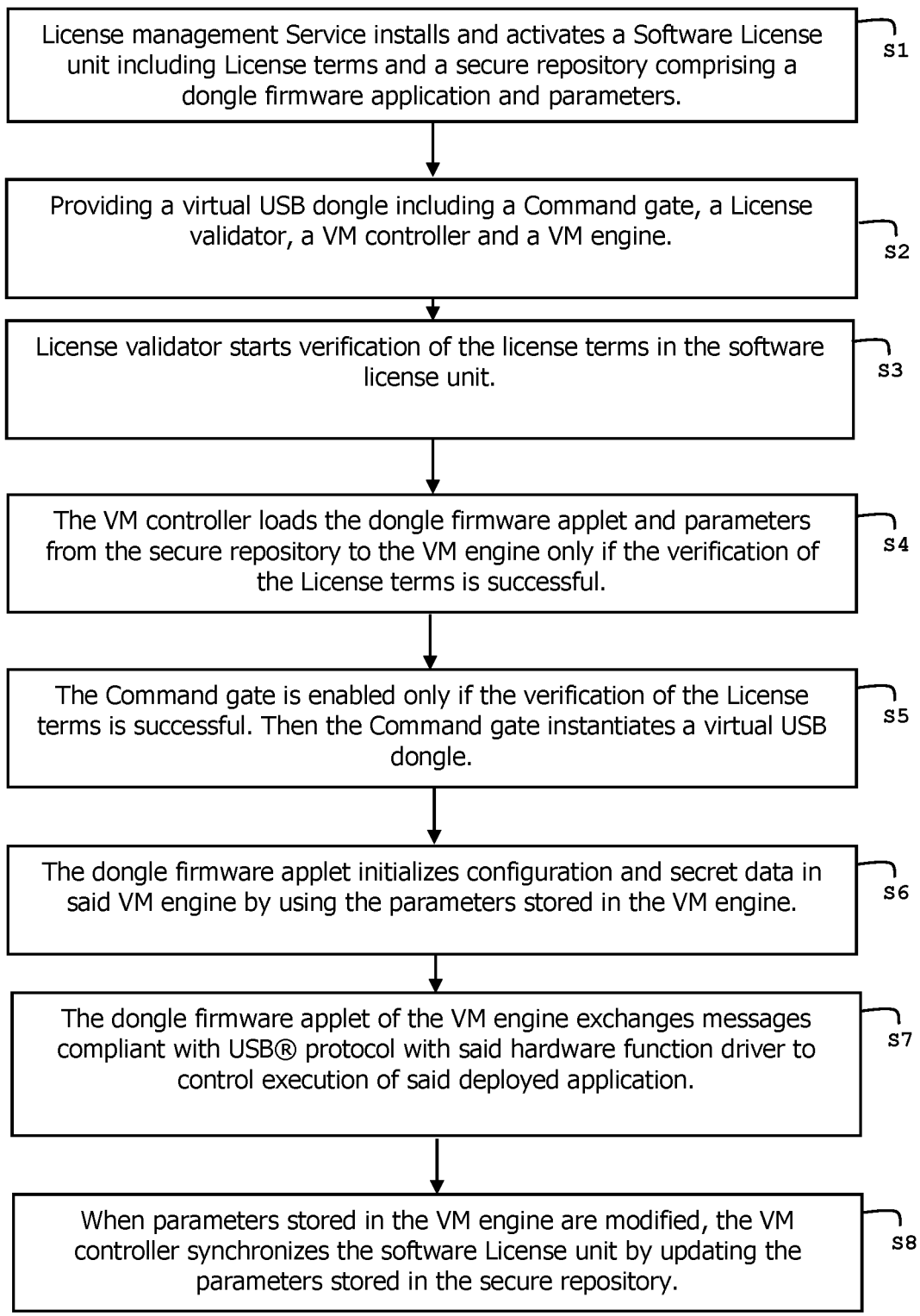
FIG. 2 depicts a flow chart for the control of execution of a deployed application according to the example of the invention in FIG. 1.

FIG. 2 shows a flow chart for the control of execution of a deployed application according to an example of the invention.

This method to control execution of the application 10 is done by a system similar to the one presented at FIG. 1.

At step S1, the License management Service 30 installs and activates a Software License unit 40 including License terms 41 and a secure repository 42 that comprise a dongle firmware (FW) application 43 and dongle parameters 44.

A virtual USB dongle 50 including a command gate 51, a License validator 52, a VM controller 53 and a VM engine 54 is created at step S2. Thus the created VM engine 54 is devoid of Dongle FW applet. It is to be noted that at this early stage, the VM engine 54 comprises neither a dongle FW applet nor dongle parameters.

Then at step S3, License Validator 52 starts verification of the license term 41 in the Software License Unit 40. In stand-alone mode, The License validator 52 can access the software license unit 40 directly by using a specific license API (Application Programming Interface) provided by the software license unit 40.

At step S4, the License validator 52 informs the VM controller 53 to load the dongle firmware applet 43 and dongle parameters 44 from the secure repository 42 to the VM engine 54 only if the verification of the License terms 41 is successful.

At step S5, the Command gate 51 is enabled only if the verification of the License terms 41 is successful. Then the Command gate 51 will instantiate the virtual USB dongle. The VM engine 54 is a virtual machine which is the interpreter of the dongle FW applet 55. Once the VM engine 54 parses and executes the dongle FW applet 55, it creates an instance of the Virtual USB Dongle.

Once the Command gate 51 enabled, the dongle firmware applet 55 initializes configuration and secret data in the VM engine 54 by using the dongle parameters 56 stored in the VM engine, at step S6.

During step S7, the dongle firmware applet 55 of the VM engine 54 exchanges messages compliant with USB® protocol with the hardware function driver 20 to control execution of the deployed application 10. The dongle firmware applet 55 emulates a legacy physical USB dongle dedicated to software license management. The deployed application can execute some login/logout, encrypt/decrypt, and read/write file operations as using the hardware USB dongle.

Preferably, when parameters stored in the VM engine 50 are modified, the VM controller 53 can synchronize the content of the software License unit 40 by updating the dongle parameters 44 stored in the secure repository 42 accordingly at step S8. Data (like configuration and secrets data or Dongle Parameters 56) stored in the VM engine 50 may be modified during control of execution of the application 10 or by the application 10. For instance, the dongle Parameters 56 can include counters which are updated each time the application starts or each time a license control is performed for the application 10.

In one embodiment, the system can comprise a preset timer which triggers the License validator 52 to verify the License terms 41. The system can be configured to load the content of the VM engine 54 and to enable the Command gate 51 if the verification of the License terms 41 successful.

In one embodiment, the system can comprise a preset timer which triggers the License validator 52 to verify the License terms 41. The system can be configured to disable the Command gate 51 and clear the content of the VM engine 54 if the verification of the License terms 41 failed.

In one embodiment, the dongle firmware application 43 can be stored in an encrypted form in the secure repository 42. During the installation phase, the VM controller 53 can decipher the dongle firmware application 43 and loads to the VM engine 54 a plain form 55 of the dongle firmware application 43.

In one embodiment, each time the virtual USB dongle 50 restarts, the License validator 52 verifies the License terms 41. The Command gate 51 is disabled and the content of the VM engine 54 is cleared if the verification of the License terms 41 is unsuccessful.

Figure 3:
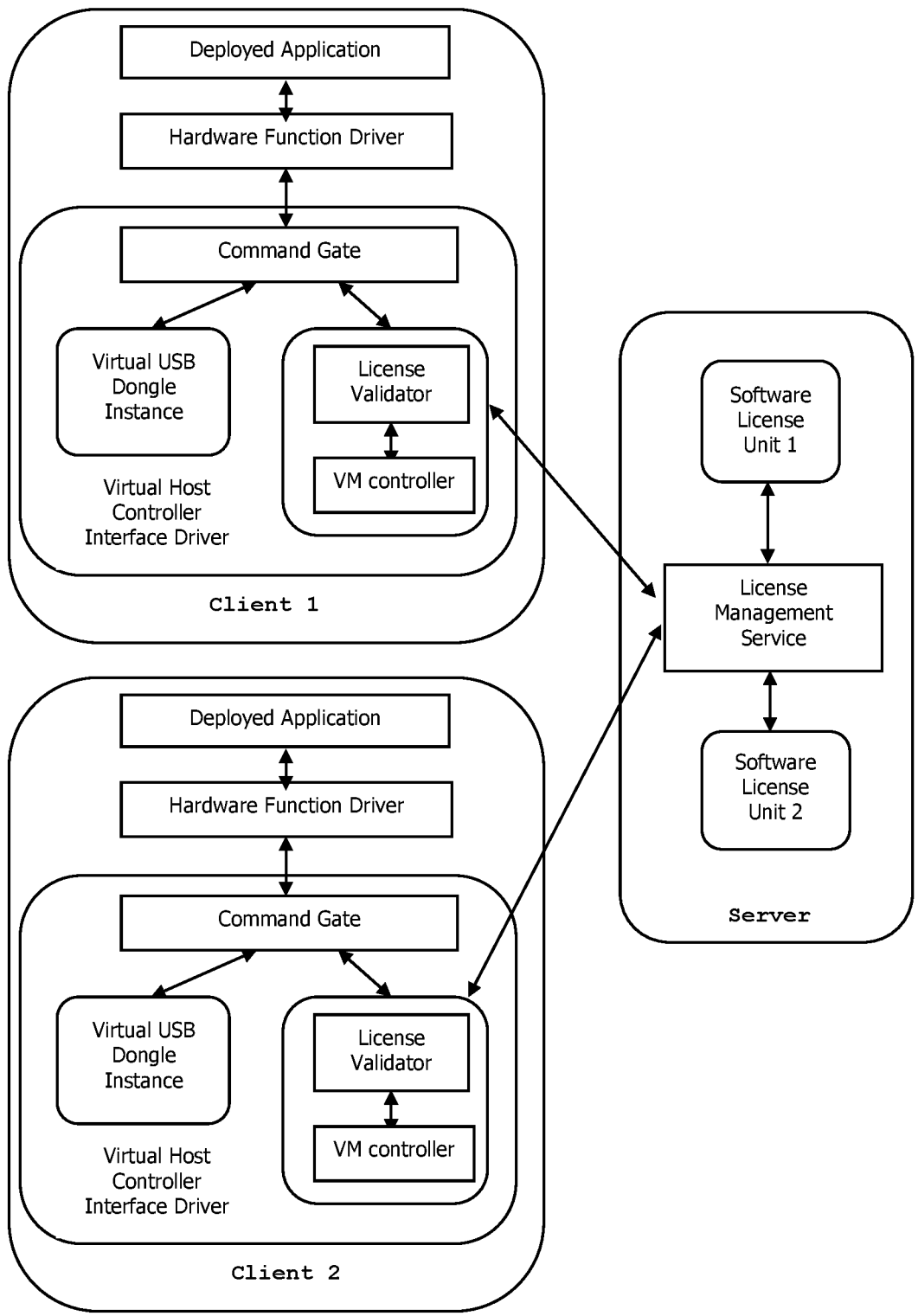
FIG. 3 is an architecture of a distributed mode system according to an example of the invention.

FIG. 3 shows an example of architecture of a distributed mode system according to an example of the invention.

The system allows to deploy the Virtual USB Dongle and the license management service on different machine, said the distributed mode system.

The system comprises a virtual USB dongle instance which is mapped to the VM engine 54 in FIG. 1.

The system comprises a deployed application and a virtual host controller interface driver which include the virtual USB dongle instance on the client machine. The distributed mode is also recorded into a mode configuration file on the client machine which installed the virtual USB dongle.

The system comprises a license management service and several software license units on the server machine. Each software license is used to control one specific virtual USB dongle on the client machine.

Compared with the stand-alone mode, the virtual USB dongle cannot access the software license unit directly. All the communication between the virtual USB dongle and the software license unit must go through the License Management Service.

Figure 4:
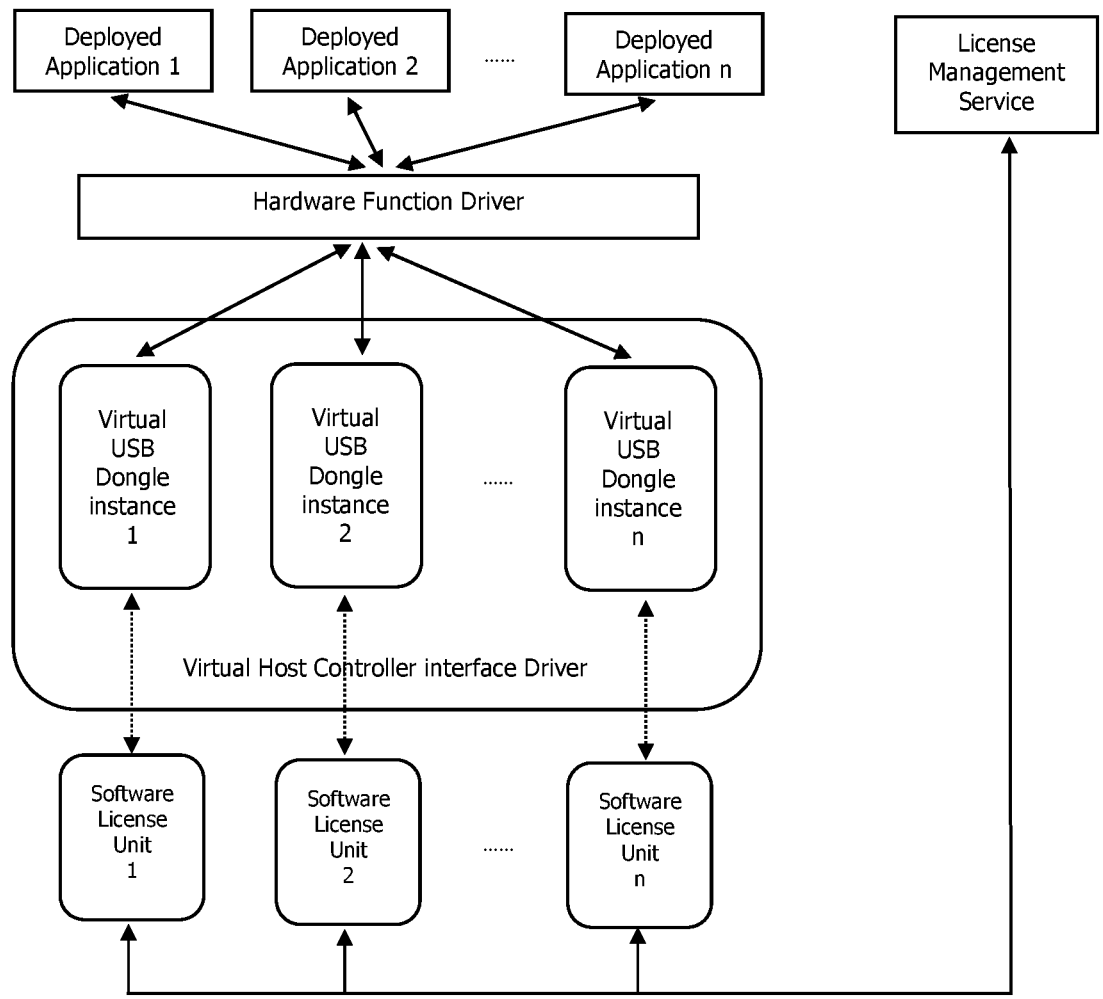
FIG. 4 shows a system for controlling a plurality of applications according to an example of the invention.

FIG. 4 depicts a system for controlling a plurality of applications according to an example of the invention.

The system allows to control execution of a number of applications (1, 2, . . . , n) which are deployed.

The system accesses the deployed applications through a legacy hardware function driver similar to the one described at FIG. 1.

The system comprises a License management Service and a several virtual USB dongle instances (1, 2, . . . , n) hosted in a Virtual Host Controller interface driver (corresponding to the virtual USB dongle of FIG. 1). The system also comprises a plurality of Software License Units (1, 2, . . . , n) created by the License management Service. A couple "virtual USB dongle instance/Software License Unit" is allocated to control one or several deployed application. More precisely, each of the virtual USB dongles is allocated to control execution of one or several of the deployed applications by using its associated Software License Unit. Preferably, there are as many couples as application to protect.

In one embodiment, a single Virtual USB dongle instance can control execution of several deployed applications by relying on as many License terms in the dongle firmware applet.

The Virtual USB Dongle 54 of FIG. 1 can be one of the Virtual USB dongle instances of FIG. 4.

The invention allows to control execution of applications initially designed to be protected by legacy hardware USB dongles. Thanks to the invention, the migration of such applications to cloud environment or to virtual environment can be easily done.

The architectures of the system shown at FIGS. 1 and 4 are provided as examples only. The architecture of the system may be different. For example, on the client machine which installed the virtual USB dongle, the system can support the user to add a separate software module out of the virtual USB dongle. This module can access the virtual USB dongle via the system i/o control interface. And it can be used by the user to trigger the license verification process manually before the dongle firmware applet and parameters loading.

Although described for applications deployed in the cloud, the invention also applies to control execution of applications deployed on independent computer devices like a Personal Computer.

The invention claimed is:

1. A computer-implemented method for controlling execution of a deployed application that relies on a hardware function driver for communicating with Universal Serial Bus (USB) devices, wherein the method comprises the steps:
   1) a License management service installs and activates a software license unit including License terms and a secure repository comprising both a dongle firmware applet and parameters,
   2) providing a virtual USB dongle including a command gate, a License validator, a VM controller and a VM engine initially devoid of Dongle FW applet,
   3) the License validator starts verification of the License terms in the Software license unit,
   4) the VM controller loads said dongle firmware applet and parameters from the secure repository to the VM engine only if the verification of the License terms is successful,
   5) the Command gate is enabled only if the verification of the License terms is successful, then the Command gate instantiates a virtual USB dongle,
   6) the dongle firmware applet initializes configuration data and secret data in said VM engine by using the parameters stored in the VM engine,
   7) the dongle firmware applet of the VM engine exchanges, messages compliant with USB protocol with said hardware function driver to control execution of said deployed application.

2. The method according to claim 1, wherein a preset timer triggers the License validator to verify said License terms and wherein if the verification of the License terms is successful the Command gate is enabled and the VM engine is loaded.

3. The method according to claim 1, wherein a preset timer triggers the License validator to verify said License terms and wherein the Command gate is disabled and the VM engine is cleared if the verification of the License terms is unsuccessful.

4. The method according to claim 1, wherein the dongle firmware application is stored in an encrypted form in the secure repository and the VM controller deciphers said dongle firmware application and loads to the VM engine a plain form of the dongle firmware application.

5. The method according to claim 1, wherein each time the virtual USB dongle restarts, the License validator verifies said License terms and wherein the Command gate is disabled and the VM engine is cleared if the verification of the License terms is unsuccessful.

6. The method according to claim 1, wherein each time the parameters stored in the VM engine are modified, the VM controller synchronizes the software License unit by updating the parameters stored in the secure repository.

7. A system for controlling execution of a deployed application which relies on a hardware function driver for communicating with USB devices, wherein the system comprises:
   a virtual USB dongle including a Command gate, a License validator, a VM controller and a VM engine, and
   a License management service configured to install and activate a software license unit including License terms and a secure repository comprising both a dongle firmware application and parameters,
   said the License validator being in turn configured to access the software license unit to verify said License terms,
   the VM controller being configured to load said dongle firmware applet and parameters from the secure repository to the VM engine only if the verification of the License terms is successful,
   the system being configured to enable the Command gate only if the verification of the License terms is successful,
   the dongle firmware applet being configured to initialize configuration data and secret data in said VM engine by using said parameters stored in the VM engine,
   the dongle firmware application being configured to exchange, messages compliant with USB protocol with said hardware function driver to control execution of said deployed application.

8. The system according to claim 7, wherein said system includes a preset timer configured to trigger the License validator to verify said License terms and wherein the system is configured to enable the Command gate and load the VM engine if the verification of the License terms is successful.

9. The system according to claim 7, wherein said system includes a preset timer configured to trigger the License validator to verify said License terms and wherein the system is configured to disable the Command gate and clear the VM engine if the verification of the License terms is unsuccessful.

10. The system according to claim 7, wherein the dongle firmware applet is stored in an encrypted form in the secure repository and the VM controller is configured to decipher said dongle firmware applet and to load to the VM engine a plain form of the dongle firmware application.

11. The system according to claim 7, wherein each time the virtual USB dongle restarts, the License validator is configured to verify said License terms and wherein the system is configured to disable the Command gate and clear the VM engine if the verification of the License terms is unsuccessful.

12. The system according to claim 7, wherein each time the parameters stored in the VM engine are modified, the VM controller is configured to synchronize the software License unit by updating the parameters stored in the secure repository.

13. The system according to claim 7, wherein said system includes several virtual USB dongles and communicate with a plurality of deployed applications, each of said virtual USB dongles being allocated to control execution of at least one or several of said deployed applications.

14. The system according to claim 7, wherein the system works in stand-alone mode.

15. The system according to claim 7, wherein the system works in distributed mode.

* * * * *